(12) United States Patent
Saini et al.

(10) Patent No.: US 12,313,753 B2
(45) Date of Patent: May 27, 2025

(54) METHOD AND APPARATUS FOR IN MOTION INITIALIZATION OF GLOBAL NAVIGATION SATELLITE SYSTEM—INERTIAL NAVIGATION SYSTEM

(71) Applicant: QUALCOMM Incorporated, San Diego, CA (US)

(72) Inventors: Vinod Kumar Saini, Bengaluru (IN); Abdelmonaem Lakhzouri, San Francisco, CA (US); Bo Zheng, Sunnyvale, CA (US); William Morrison, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 225 days.

(21) Appl. No.: 18/331,026

(22) Filed: Jun. 7, 2023

(65) Prior Publication Data

US 2023/0314629 A1 Oct. 5, 2023

Related U.S. Application Data

(62) Division of application No. 16/927,337, filed on Jul. 13, 2020, now Pat. No. 11,754,726.

(51) Int. Cl.
*G01S 19/47* (2010.01)
*G01S 19/39* (2010.01)
(Continued)

(52) U.S. Cl.
CPC ............ *G01S 19/47* (2013.01); *G01S 19/393* (2019.08); *G01S 19/428* (2013.01); *G01S 19/52* (2013.01)

(58) Field of Classification Search
CPC ...... G01S 19/47; G01S 19/393; G01S 19/428; G01S 19/52; G01C 25/005
See application file for complete search history.

(56) References Cited

U.S. PATENT DOCUMENTS

2009/0048779 A1\* 2/2009 Zeng .................. G01C 21/1654
701/511
2012/0173140 A1 7/2012 Czompo et al.
(Continued)

FOREIGN PATENT DOCUMENTS

WO 2012075463 A1 6/2012

OTHER PUBLICATIONS

International Search Report and Written Opinion—PCT/US2021/036213—ISA/EPO—Dec. 21, 2021.
(Continued)

*Primary Examiner* — Alan D Hutchinson
(74) *Attorney, Agent, or Firm* — Thien T. Nguyen

(57) ABSTRACT

A mobile device in a moving vehicle initializes a Global Navigation Satellite System (GNSS)—Inertial Navigation System (INS) system while the vehicle is in-motion with the orientation of the mobile device with respect to a global reference frame. The mobile device uses gyroscope measurements made while the vehicle is turning to determine a gravity vector. The gravity vector and accelerometer measurements may be used to determine a forward vector for the mobile device. A north vector is determined using the GNSS measurements. After the GNSS-INS system is calibrated, the mobile device may be positioned with respect to the vehicle. The orientation of the mobile device, prior to repositioning, may be compared to a current orientation, determined while the vehicle is in motion, in order to determine whether the GNSS-INS system should be re-initialized.

30 Claims, 7 Drawing Sheets

(51) Int. Cl.
   *G01S 19/42*      (2010.01)
   *G01S 19/52*      (2010.01)

(56) References Cited

U.S. PATENT DOCUMENTS

| 2017/0059326 | A1  | 3/2017  | Zhang |
| 2017/0227656 | A1  | 8/2017  | Niesen et al. |
| 2017/0343349 | A1* | 11/2017 | Han ........................ G01C 19/56 |
| 2020/0124443 | A1* | 4/2020  | Chen ....................... G01R 33/02 |
| 2022/0011447 | A1  | 1/2022  | Saini |

OTHER PUBLICATIONS

Javier A., et al., "Full Auto-Calibration of a Smartphone on Board a Vehicle Using IMU and GPS Embedded Sensors", 2013 IEEE Intelligent Vehicles Symposium (IV), IEEE, Jun. 23, 2013, pp. 1374-1380, XP032501976, 8 Pages, ISSN: 1931-0587, DOI: 10.1109/IVS.2013.6629658, Abstract figures 1-10 I-C. Contribution II-B. System architecture, III. Yaw angle estimation, III-A. Signal filtering, III-B. Decoupling Between Gravity Acceleration and Vehicle Acceleration III-C. Yaw Angle Based on Single Sample.

Johan W., et al., "IMU Alignment for Smartphone-Based Automotive Navigation", 2015 18th International Conference On Information Fusion (Fusion), ISIF, Jul. 6, 2015 (Jul. 6, 2015), pp. 1437-1443. XP033204855. [Retrieved on Sep. 14, 2015] Abstract figure 1 I. Introduction, II. Problem formulation.

Partial International Search Report—PCT/US2021/036213—ISA/EPO—Oct. 1, 2021.

European Search Report—EP23188041—Search Authority—The Hague—Oct. 20, 2023.

\* cited by examiner

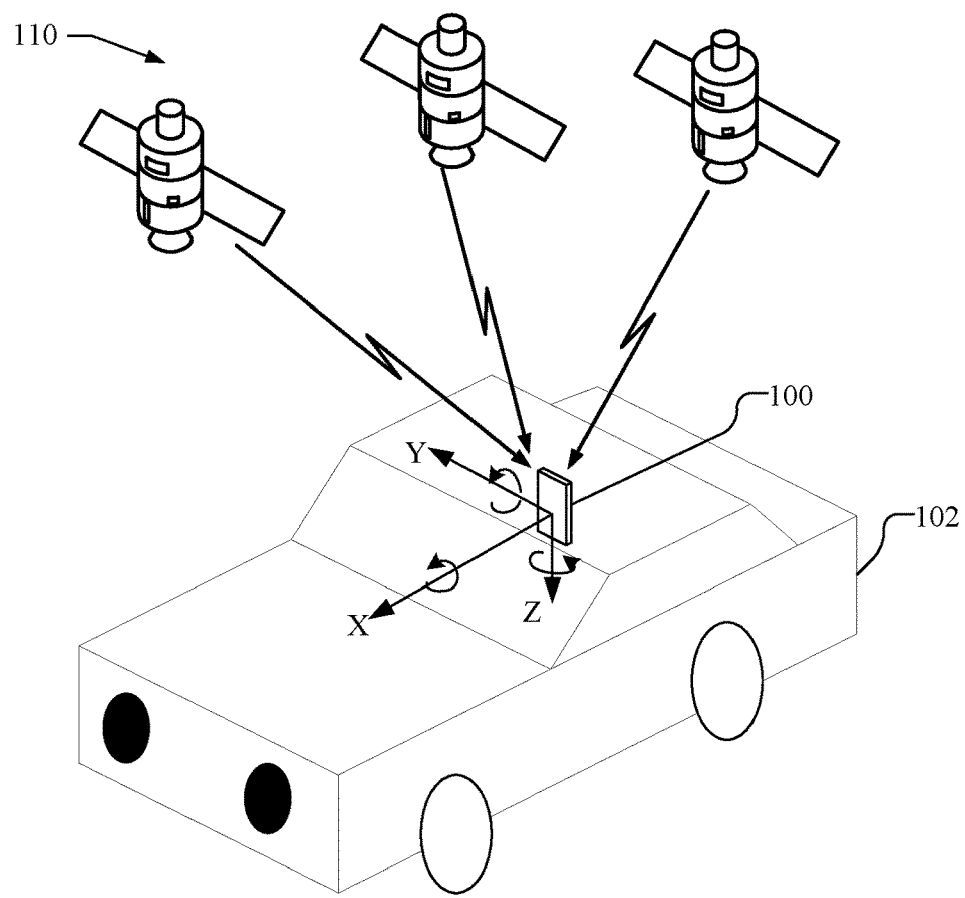
FIG. 1
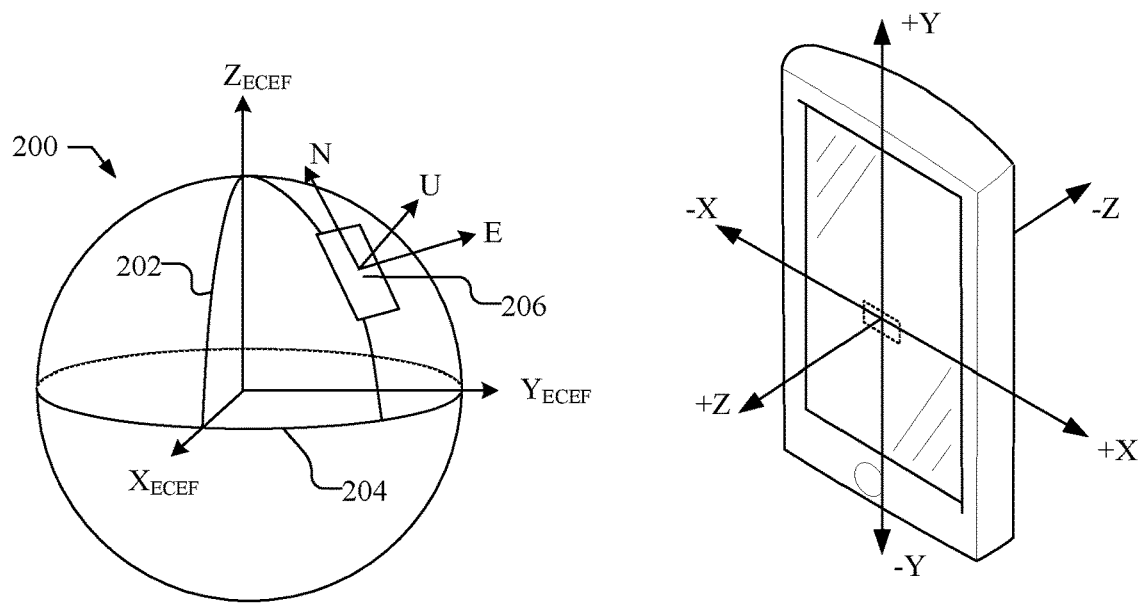
FIG. 2A  FIG. 2B

METHOD AND APPARATUS FOR IN MOTION INITIALIZATION OF GLOBAL NAVIGATION SATELLITE SYSTEM—INERTIAL NAVIGATION SYSTEM

CROSS-REFERENCE TO RELATED APPLICATIONS

This application is a Divisional of U.S. application Ser. No. 16/927,337, entitled "METHOD AND APPARATUS FOR IN MOTION INITIALIZATION OF GLOBAL NAVIGATION SATELLITE SYSTEM-INERTIAL NAVIGATION SYSTEM" and filed on Jul. 13, 2020, which is assigned to the assignee hereof and is incorporated herein by reference in its entirety.

BACKGROUND

Background Field

This disclosure relates generally to apparatus and methods for positioning of a wireless device using a combination of navigation systems, and more particularly to initialization of the navigation systems for positioning.

Relevant Background

Mobile devices used for navigation in a car or other vehicle sometimes use Global Navigation Satellite Systems (GNSS) positioning information in addition to measurements from an inertial navigation sensors (INS) to determine an accurate position and formulate a current speed and heading. The GNSS provides an absolute position while inertial sensors in the INS, such as accelerometers and gyroscopes, for example, provide a relative position. The absolution position from the GNSS may be used to calibrate the INS, while the INS may be used to provide position and heading updates faster than GNSS. Moreover, the INS may be used to compensate for loss of GNSS signals while the mobile device is located in GNSS denied environments, such as urban canyons, by continuing to provide position and heading updates, e.g., dead reckoning, from the last known GNSS position. Additional types of sensors, such as visual/camera sensors (e.g., visual inertial odometry (VIO)), may be used with GNSS to assist with position and head determination.

A GNSS-INS filter requires initialization in order to estimate the orientation of the mobile device with respect to the global reference frame. For example, when the mobile device is placed in the vehicle, e.g., mounted in a cradle or other fixed structure in the vehicle, the orientation of the inertial sensors within the mobile device, with respect to the vehicle and with respect to the global reference frame is unknown. Sensor calibration typically requires the mobile device and vehicle to be stationary so that there is no external acceleration forces. The mobile device orientation within the vehicle, however, may arbitrarily and frequently change. For example, a user may move the mobile device within the vehicle or the position of the mobile device may shift while traveling. It may be necessary to re-initialize the GNSS-INS filter after the mobile device orientation has changed. However, while traveling, there may be few stationary periods with no external acceleration forces during which the GNSS-INS filter may be re-initialized.

SUMMARY

A mobile device in a moving vehicle initializes a Global Navigation Satellite System (GNSS)—Inertial Navigation System (INS) system while the vehicle is in-motion with the orientation of the mobile device with respect to a global reference frame. The mobile device uses gyroscope measurements made while the vehicle is turning to determine a gravity vector. The gravity vector and accelerometer measurements may be used to determine a forward vector for the mobile device. A north vector is determined using the GNSS measurements. After the GNSS-INS system is calibrated, the mobile device may be positioned with respect to the vehicle. The orientation of the mobile device, prior to repositioning, may be compared to a current orientation, determined while the vehicle is in motion, in order to determine whether the GNSS-INS system should be re-initialized.

In one implementation, a method of in-motion calibration of a Global Navigation Satellite System (GNSS)—Inertial Navigation System (INS) system in a mobile device in a vehicle, includes determining a gravity vector based on gyroscope measurements while the vehicle is turning; determining a forward vector based on the gravity vector and accelerometer measurements while the vehicle is traveling straight; determining a north vector based on GNSS measurements of a heading angle; and initializing a GNSS-INS filter using the gravity vector, the forward vector and the north vector.

In one implementation, a mobile device in a vehicle, the mobile device configured to support in-motion calibration of a Global Navigation Satellite System (GNSS)-Inertial Navigation System (INS) system in the mobile device, the mobile device includes an inertial measurement unit comprising an accelerometer and a gyroscope; a GNSS receiver; at least one memory; at least one processor coupled to the inertial measurement unit and the GNSS receiver and the at least one memory, wherein the at least one processor is configured to: determine a gravity vector based on gyroscope measurements while the vehicle is turning; determine a forward vector based on the gravity vector and accelerometer measurements while the vehicle is traveling straight; determine a north vector based on GNSS measurements of a heading angle; and initialize a GNSS-INS filter using the gravity vector, the forward vector and the north vector.

In one implementation, a mobile device in a vehicle, the mobile device configured to support in-motion calibration of a Global Navigation Satellite System (GNSS)-Inertial Navigation System (INS) system in the mobile device, includes means for determining a gravity vector based on gyroscope measurements while the vehicle is turning; means for determining a forward vector based on the gravity vector and accelerometer measurements while the vehicle is traveling straight; means for determining a north vector based on GNSS measurements of a heading angle; and means for initializing a GNSS-INS filter using the gravity vector, the forward vector and the north vector.

In one implementation, a non-transitory storage medium including program code stored thereon, the program code is operable to configure at least one processor in a mobile device in a vehicle, the mobile device configured to support in-motion calibration of a Global Navigation Satellite System (GNSS)-Inertial Navigation System (INS) system in the mobile device, includes program code to determine a gravity vector based on gyroscope measurements while the vehicle is turning; program code to determine a forward vector based on the gravity vector and accelerometer measurements while the vehicle is traveling straight; program code to determine a north vector based on GNSS measurements of a heading angle; and program code to initialize a GNSS-INS filter using the gravity vector, the forward vector and the north vector.

In one implementation, a method of in-motion calibration of a Global Navigation Satellite System (GNSS)-Inertial Navigation System (INS) system in a mobile device in a vehicle, includes determining a first orientation of the mobile device with respect to a global reference frame based on a previous calibration of a GNSS-INS filter; detecting an indication that the mobile device has moved with respect to the vehicle; determining a second orientation of the mobile device with respect to the global reference frame based on an in-motion calibration of the GNSS-INS filter while the vehicle is moving; comparing the first orientation and the second orientation; and using the first orientation for the GNSS-INS filter to produce a position and heading based on the first orientation if a difference between the first orientation and the second orientation to produce the position and heading based on the second orientation is below a threshold and using the second orientation for the GNSS-INS filter if the difference between the first orientation and the second orientation is above the threshold.

In one implementation, a mobile device in a vehicle, the mobile device configured to support in-motion calibration of a Global Navigation Satellite System (GNSS)-Inertial Navigation System (INS) system in the mobile device, includes an inertial measurement unit comprising an accelerometer and a gyroscope; a GNSS receiver; at least one memory; at least one processor coupled to the inertial measurement unit and the GNSS receiver and the at least one memory, wherein the at least one processor is configured to: determine a first orientation of the mobile device with respect to a global reference frame based on a previous calibration of a GNSS-INS filter; detect an indication that the mobile device has moved with respect to the vehicle; determine a second orientation of the mobile device with respect to the global reference frame based on an in-motion calibration of the GNSS-INS filter while the vehicle is moving; compare the first orientation and the second orientation; and use the first orientation for the GNSS-INS filter to produce a position and heading based on the first orientation if a difference between the first orientation and the second orientation is below a threshold and using the second orientation for the GNSS-INS filter to produce the position and heading based on the second orientation if the difference between the first orientation and the second orientation is above the threshold.

In one implementation, mobile device in a vehicle, the mobile device configured to support in-motion calibration of a Global Navigation Satellite System (GNSS)-Inertial Navigation System (INS) system in the mobile device, includes means for determining a first orientation of the mobile device with respect to a global reference frame based on a previous calibration of a GNSS-INS filter; means for detecting an indication that the mobile device has moved with respect to the vehicle; means for determining a second orientation of the mobile device with respect to the global reference frame based on an in-motion calibration of the GNSS-INS filter while the vehicle is moving; means for comparing the first orientation and the second orientation; and means for using the first orientation for the GNSS-INS filter to produce a position and heading based on the first orientation if a difference between the first orientation and the second orientation is below a threshold and using the second orientation for the GNSS-INS filter to produce the position and heading based on the second orientation if the difference between the first orientation and the second orientation is above the threshold.

In one implementation, a non-transitory storage medium including program code stored thereon, the program code is operable to configure at least one processor in a mobile device in a vehicle, the mobile device configured to support in-motion calibration of a Global Navigation Satellite System (GNSS)-Inertial Navigation System (INS) system in the mobile device, includes program code to determine a first orientation of the mobile device with respect to a global reference frame based on a previous calibration of a GNSS-INS filter; program code to detect an indication that the mobile device has moved with respect to the vehicle; program code to determine a second orientation of the mobile device with respect to the global reference frame based on an in-motion calibration of the GNSS-INS filter while the vehicle is moving; program code to compare the first orientation and the second orientation; and program code to use the first orientation for the GNSS-INS filter to produce a position and heading based on the first orientation if a difference between the first orientation and the second orientation is below a threshold and using the second orientation for the GNSS-INS filter to produce the position and heading based on the second orientation if the difference between the first orientation and the second orientation is above the threshold.

BRIEF DESCRIPTION OF THE DRAWING

Non-limiting and non-exhaustive aspects are described with reference to the following figures, wherein like reference numerals refer to like parts throughout the various figures unless otherwise specified.

FIG. 1 illustrates a mobile device within a vehicle that may be configured to support in-motion calibration of a GNSS-INS system.

FIG. 2A illustrates the Earth and a global reference system that may be used by a GNSS.

FIG. 2B illustrates a mobile device and a body reference system.

DETAILED DESCRIPTION

Figure 3:
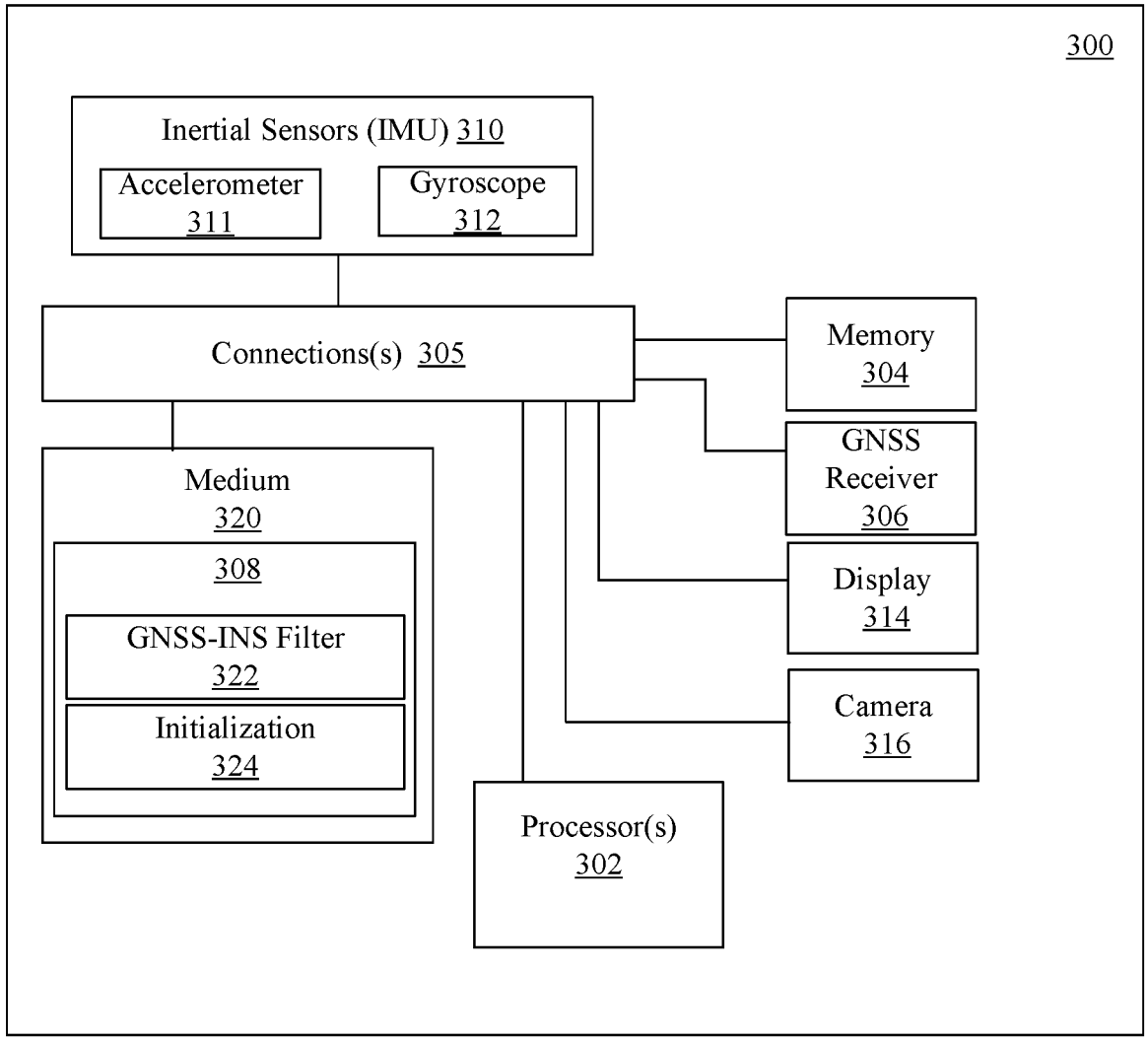
FIG. 3 shows a block diagram of a mobile device, which may be configured for positioning using combined GNSS and INS measurements and to initialize the GNSS-INS system while in motion.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, GLONASS or Compass may transmit a signal marked with a PN code that is distinguishable from PN codes transmitted by other SVs in the constellation (e.g., using different PN codes for each satellite as in GPS or using the same code on different frequencies as in GLONASS). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a mobile device, sometimes referred to as a mobile station (MS) or user equipment (UE), such as a cellular phone, mobile phone or other wireless communication device, personal communication system (PCS) device, personal navigation device (PND), Personal Information Manager (PIM), Personal Digital Assistant (PDA), tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc., or other suitable mobile device which is capable of receiving wireless communication and/or navigation signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile station."

FIG. 1 illustrates a mobile device 100 inside a vehicle 102, e.g., illustrated as a car, along with a satellite positioning system (SPS), referred to herein as GNSS 110. The mobile device 100 may be mounted in a cradle or otherwise held within the vehicle 102. Moreover, while mobile device 100 is illustrated within a car, it should be understood that the mobile device 100 may be within any terrestrial or aerial vehicle. The mobile device 100 may be placed within the vehicle 102, e.g., to assist the user with navigation while traveling in the vehicle 102. The mobile device 100 may act as a hands-free device, displaying local maps and may present audio and visual routing information.

The mobile device 100 may use GNSS signals received from satellites in the GNSS 110 as well as local sensor data to estimate a current position, velocity or heading of the vehicle 102. As illustrated, the coordinate system of the vehicle 102 is defined by a horizontal X-Y plane that is perpendicular to the gravity vector, which forms the forms the Z-axis. The X-axis may be defined as the direction the vehicle 102 is facing and the Y-axis may be defined as a lateral direction perpendicular to both the forward direction (X-axis) and the gravity vector (Z-axis) in the vertical direction. Rotations about each axis may be defined as roll (rotation about the X-axis), pitch (rotation about the Y-axis), and yaw (rotation about the Z axis).

The X, Y, and Z-axes represent a local reference system that is local to the vehicle 102. Additionally, a global reference frame may be represented by longitude and latitude or by longitude, latitude and elevation. GNSS data is generated with respect to the global reference frame. A third reference system is the body reference system, which is defined relative to the body of the mobile device 100. The inertial sensor data, for example, is generated in the body reference system by the inertial sensors within the mobile device 100.

FIG. 2A illustrates the Earth 200 and a global reference system that may be used by a GNSS. As illustrated, in an earth-centered, earth fixed (ECEF) coordinate system, an $X_{ECEF}$ axis extends from the center of the Earth to the Prime Meridian 202 at 0° latitude at the Equator 204 at 0° longitude, and the $Z_{ECEF}$ axis extends from the center of the Earth to the north pole, and the $Y_{ECEF}$ axis, which is perpendicular to the $X_{ECEF}$ and $Z_{ECEF}$ axes. A position 206 on the surface of the Earth may be defined by latitude (angle with respect to the Equator), and longitude (angle with respect to the Prime Meridian), and the heading may be defined with respect to North (N), East (E), and up (U).

FIG. 2B illustrates a mobile device 100 and a body reference system, including X, Y, and Z axes with respect to the body of the mobile device 100. An inertial measurement unit (IMU) 210 within the mobile device 100 provides sensor data with respect to the body reference system. It should be understood that the sensors within the IMU 210, e.g., three axis accelerometers and three axis gyroscopes, produce sensor data with respect to the inertial frame in the body reference system, which may be converted to the navigation frame.

During initialization of a GNSS-INS system in the mobile device 100 it is necessary to calibrate the orientation of the IMU 210 with respect to a global reference frame, and in particular with respect to the gravity vector, a forward vector, and a north vector. Typically, the calibration to the global reference frame requires a period when the mobile device 100 and vehicle 102 are static, i.e. not moving, so that there is no acceleration applied to the inertial sensors. During static calibration, the accelerometers in the inertial sensors may detect the direction of gravity.

In some instances, however, the mobile device 100 and vehicle 102 may be traveling when initialization needs to be performed. For example, the vehicle 102 may already be moving when the GNSS-INS system is first engaged. Alternatively, the GNSS-INS system may have already been initialized, e.g., during a static period, and the orientation of the mobile device 100 within the vehicle 102 may be altered while the vehicle 102 moving. For example, the user may move the mobile device 100 or the mobile device 100 may shift from its position while the vehicle is moving. Thus, re-initialization of the GNSS-INS system may be desirable while the vehicle is in motion.

FIG. 3 shows a block diagram of a mobile device 100, which may be configured for positioning using combined GNSS and INS measurements and to initialize the GNSS-INS system while in motion, as discussed here. The mobile device 100 includes inertial sensors 310, also referred to as an inertial measurement unit (IMU) 310, which may include both an accelerometer 311 and a gyroscope 312. Both the accelerometer 311 and the gyroscope 312 may generate three-dimensional measurements.

The mobile device 100 also includes a GNSS receiver 306 and one or more processors 302, that, along with IMU 310, are operatively coupled with one or more connections 305 (e.g., buses, lines, fibers, links, etc.) to non-transitory computer readable medium 320 and memory 304. The mobile device 100 may further include additional items, such as a display 314 and a camera 316. The display 314, for example, may be coupled to the processor 302 and may be used to present map, routing information and directional information to the user. The camera 316 may be used as a sensor, e.g., for visual inertial odometry (VIO). Mobile device 100 may include additional elements, such as a keypad or other input device, such as virtual keypad on the display, through which a user may interface with the user device. In certain example implementations, all or part of mobile device 100 may take the form of a chipset, and/or the like.

The accelerometer 311 produces data in the form of three-dimensional accelerometer measurements $(a_x, a_y, a_z)$, which is referenced to the body reference system using accelerometer biases. The gyroscope 312 produces data in the form of an angular rate $(\omega_x, \omega_y, \omega_z)$, which identifies an angular change from a previous measurement. The angular rate data produced by the gyroscope 312 is also a three-dimensional measurement referenced to the body reference system using gyroscope biases. The GNSS receiver 306 may provide an absolute location, e.g., latitude, longitude, and elevation, and may provide a GNSS velocity and heading, which may be a scalar value referenced to North (0°).

The one or more processors 302 may be implemented using a combination of hardware, firmware, and software. For example, the one or more processors 302 may be configured to perform the functions discussed herein by implementing one or more instructions or program code 308 on a non-transitory computer readable medium, such as medium 320 and/or memory 304. In some embodiments, the one or more processors 302 may represent one or more circuits configurable to perform at least a portion of a data signal computing procedure or process related to the operation of mobile device 100.

The medium 320 and/or memory 304 may store instructions or program code 308 that contain executable code or software instructions that when executed by the one or more processors 302 cause the one or more processors 302 to operate as a special purpose computer programmed to perform the techniques disclosed herein. As illustrated in mobile device 100, the medium 320 and/or memory 304 may include one or more components or modules that may be implemented by the one or more processors 302 to perform the methodologies described herein. While the components or modules are illustrated as software in medium 320 that is executable by the one or more processors 302, it should be understood that the components or modules may be stored in memory 304 or may be dedicated hardware either in the one or more processors 302 or off the processors.

A number of software modules and data tables may reside in the medium 320 and/or memory 304 and be utilized by the one or more processors 302 in order to manage both communications and the functionality described herein. It should be appreciated that the organization of the contents of the medium 320 and/or memory 304 as shown in mobile device 100 is merely exemplary, and as such the functionality of the modules and/or data structures may be combined, separated, and/or be structured in different ways depending upon the implementation of the mobile device 100.

The medium 320 and/or memory 304, for example, may include a GNSS-INS filter module 322 that when implemented by the one or more processors 302 configures the one or more processors 302 to blend GNSS data from the GNSS receiver 306 with the INS data from IMU 310 to provide positioning and heading information. The one or more processors 302, for example, may operate as a Kalman filter. In some implementations, the GNSS-INS filter may be implemented in hardware or may be implemented by processor 302 operating a special purpose computer programmed by GNSS-INS filter module 322, and accordingly, will be referred to as GNSS-INS filter 322.

The medium 320 and/or memory 304, for example, may include an initialization module 322 that when implemented by the one or more processors 302 configures the one or more processors 302 to initialize the GNSS-INS filter based on the INS data from IMU 310 and the GNSS data from the GNSS receiver 306 as discussed herein.

The methodologies described herein may be implemented by various means depending upon the application. For example, these methodologies may be implemented in hardware, firmware, software, or any combination thereof. For a hardware implementation, the one or more processors 302 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 320 or memory 304 that is connected to and executed by the one or more processors 302. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 308 on a non-transitory computer readable medium, such as medium 320 and/or memory 304. Examples include computer readable media encoded with a data structure and computer readable media encoded with a computer program 308. For example, the non-transitory computer readable medium including program code 308 stored thereon may include program code 308 to support GNSS-INS initialization in a manner consistent with disclosed embodiments. Non-transitory computer readable medium 320 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 308 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 320, instructions and/or data may be provided as signals on transmission media included in a communication apparatus in the mobile device 100, such as a wireless transceiver capable of receiving WWAN or WLAN signals. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions.

Memory 304 may represent any data storage mechanism. Memory 304 may include, for example, a primary memory and/or a secondary memory. Primary memory may include, for example, a random access memory, read only memory, etc. While illustrated in this example as being separate from one or more processors 302, it should be understood that all or part of a primary memory may be provided within or otherwise co-located/coupled with the one or more processors 302. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 320. As such, in certain example implementations, the methods and/or apparatuses presented herein may take the form in whole or part of a computer readable medium 320 that may include computer implementable code 308 stored thereon, which if executed by one or more processors 302 may be operatively enabled to perform all or portions of the example operations as described herein. Computer readable medium 320 may be a part of memory 304.

As discussed above, in some implementations, the mobile device 100 may be in a moving vehicle 102 when initialization of the GNSS-INS filter 322 needs to be performed. For example, mobile device 100 may be in the vehicle 102 that is already when the GNSS-INS system is first engaged, or the GNSS-INS system may have already been initialized and the orientation of the mobile device 100 within the vehicle 102 may be altered, requiring a re-initialization of the GNSS-INS system while the vehicle 102 moving.

Figure 4:
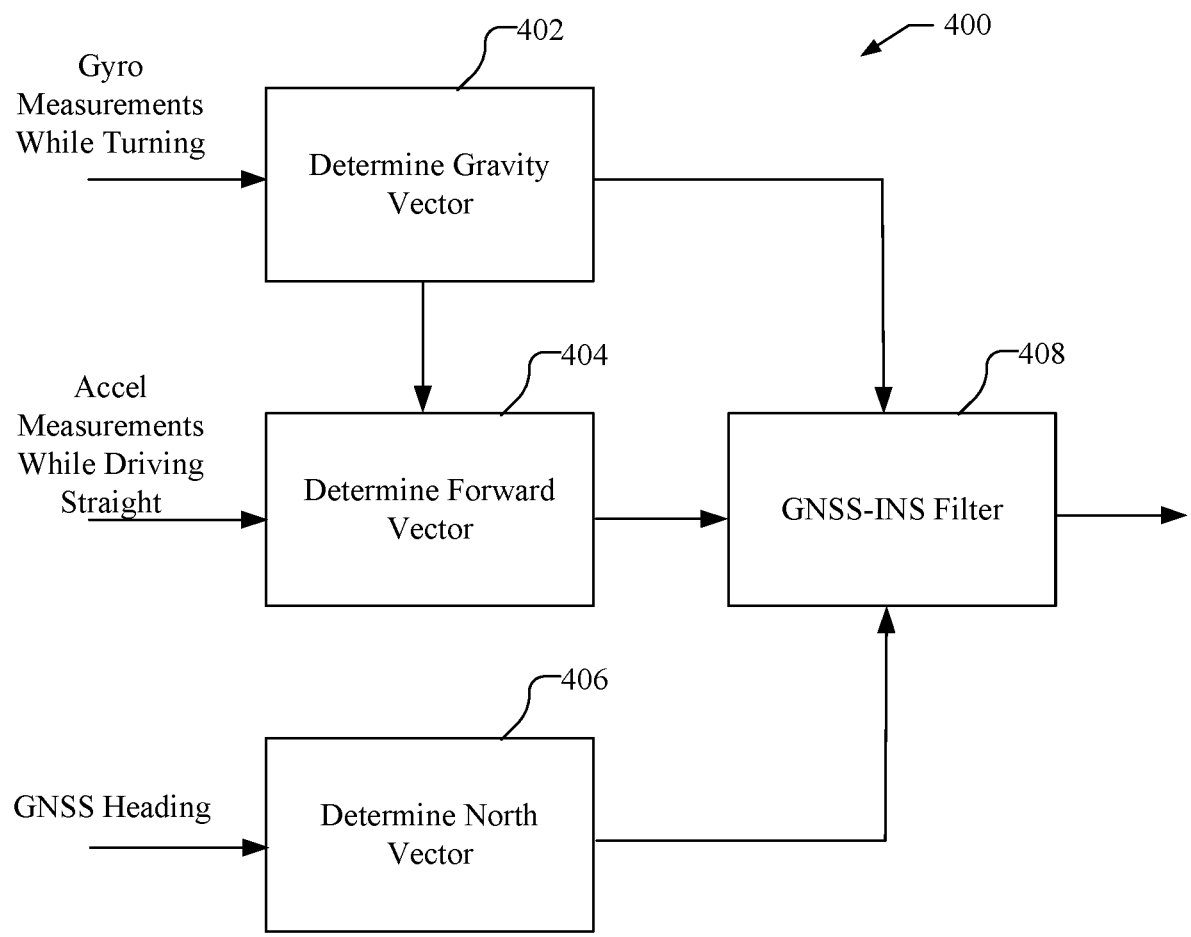
FIG. 4 is a flow diagram illustrating a process of in-motion initialization of a GNSS-INS filter in the mobile device that is held in a fixed orientation in a vehicle.

FIG. 4 is a flow diagram 400 illustrating a process of in-motion initialization of a GNSS-INS filter 322 in the mobile device 100 that is held in a fixed orientation in a vehicle 102. In the process illustrated in flow diagram 400, it may be assumed the gyroscope and accelerometer biases are known. If biases are not known, the process may still be used for initialization, assuming zero biases. Not knowing the biases may affect the detection of driving straight, e.g., in block 404, and turning, e.g., in block 402. The vehicle motion, however, may still be classified, e.g., turning, driving straight, by checking the gyroscope and accelerometer variance and variation.

As illustrated, at block 402, the gravity vector is estimated based on gyroscope measurements made while the vehicle 102 is turning, e.g., on a flat surface. Turning of the vehicle 102 may be detected, for example, using the gyroscope measurements, e.g., when the measured angular rate ($\omega_x, \omega_y, \omega_z$) is greater than a threshold indicating that the vehicle 102 is turning. The threshold may be a predetermined threshold large enough to avoid a false indication of turning due to noise in the sensor measurements. During the turn, the gyroscope measures the angular rate along the gravity axis. The gravity vector may be determined as:

$$\vec{g} = \frac{1}{\|\omega\|_2}[\omega_x, \omega_y, \omega_z] \qquad \text{eq. 1}$$

where $[\omega_x, \omega_y, \omega_z]$ is the angular rate for each gyroscope axis, and $\|\omega\|_2$ is the normalized angular rate.

In some implementations, when turning is detected, a process may be performed to determine if the turn is on a banked curve or a flat curve. For example, a turn may last a few seconds, e.g., 6-10 seconds, during which a plurality, e.g., 600-1000, of gyroscope measurements may made, assuming a gyroscope updates at, e.g. 100 Hz. The gravity vector may be obtained by averaging all of the gyroscope measurements during the turn, e.g., as follows.

$$\vec{g}_{avg} = \sum_{i=1 \to n} \frac{1}{\|\omega\|_2}[\omega_{i,x}, \omega_{i,y}, \omega_{i,z}] \qquad \text{eq. 2}$$

In order to detect a banked curve or a flat curve, an angle is computed between the gravity vector that is computed for each sample of gyroscope measurement $\vec{g}_i$, and the averaged gravity vector $\vec{g}_{avg}$.

$$\vec{g}_i = \frac{1}{\|\omega\|_2}[\omega_{i,x}, \omega_{i,y}, \omega_{i,z}] \qquad \text{eq. 3}$$

$$\theta_i = \cos^{-1}(\text{dot product }(\vec{g}_{avg}, \vec{g}_i)) \qquad \text{eq. 4}$$

On a flat curve, $\theta_i$ for each sample will be almost zero, while on a banked curve, $\theta_i$ will vary and will not be zero due to the change in gravity vector during the turn.

At block 404, the forward vector is determined when the vehicle 102 is not turning, i.e., during straight line motion, while the vehicle is accelerating or decelerating. A time when the vehicle 102 is traveling straight may be detected, for example, using the gyroscope measurements, e.g., when the measured angular rate $(\omega_x, \omega_y, \omega_z)$ is below the threshold indicating that the vehicle 102 is not turning. The forward vector $\vec{f}$ may be determined based on the measured accelerometer data $\vec{a}$, the gravity vector $\vec{g}$ determined from the gyroscope data, and the known accelerometer biases, as:

$$\vec{f} = \begin{bmatrix} a_x - g_x - a_{x,bias} \\ a_y - g_y - a_{y,bias} \\ a_z - g_z - a_{z,bias} \end{bmatrix} \qquad \text{eq. 5}$$

At block 406, the North vector is determined using the heading angle received from the GNSS receiver.

At block 408, the gravity vector, the forward vector and the North vector are provided for initialization of the GNSS-INS filter, e.g., Kalman filter. Initializing the GNSS-INS filter provides an orientation of the mobile device 100 with respect to the global reference frame. Once initialized, the GNSS-INS filter may produce a position and heading based on received GNSS data and IMU data.

In some implementations, the GNSS-INS filter in a mobile device 100 may already be initialized when the mobile device 100 is moved within the vehicle. For example, the GNSS-INS filter may have been initialized while in motion, e.g., using the initialization process illustrated in FIG. 4, or in another example, the GNSS-INS be have been conventionally initialized during a static period, i.e., when the mobile device 100 and the vehicle 102 are not moving. For example, in a conventional static initialization the accelerometer data may be used to detect the gravity vector. While the vehicle 102 is in motion, the mobile device 100 may be moved within the vehicle 102. For example, a user may move the mobile device 100 or the mobile device 100 may inadvertently be moved. In some instances, the mobile device 100 may be moved from one orientation with respect to the vehicle 102, and returned to a different orientation with respect to the vehicle 102. In such an instance, re-initialization of the GNSS-INS filter while the vehicle is in motion may be necessary. In other instances, however, the mobile device 100 may be returned to the original orientation within the vehicle 102. For example, a user may momentarily remove the mobile device 100 from a cradle in the vehicle 102 and may return the mobile device to the cradle, and thus, the mobile device 100 may be returned to the same orientation with respect to the car. In such an instance, it may not be necessary or beneficial to re-initialize the orientation of the GNSS-INS filter. For example, re-initialization of the orientation of the GNSS-INS filter may result in the unnecessary loss of the position history that may be used by the GNSS-INS filter.

Figure 5:
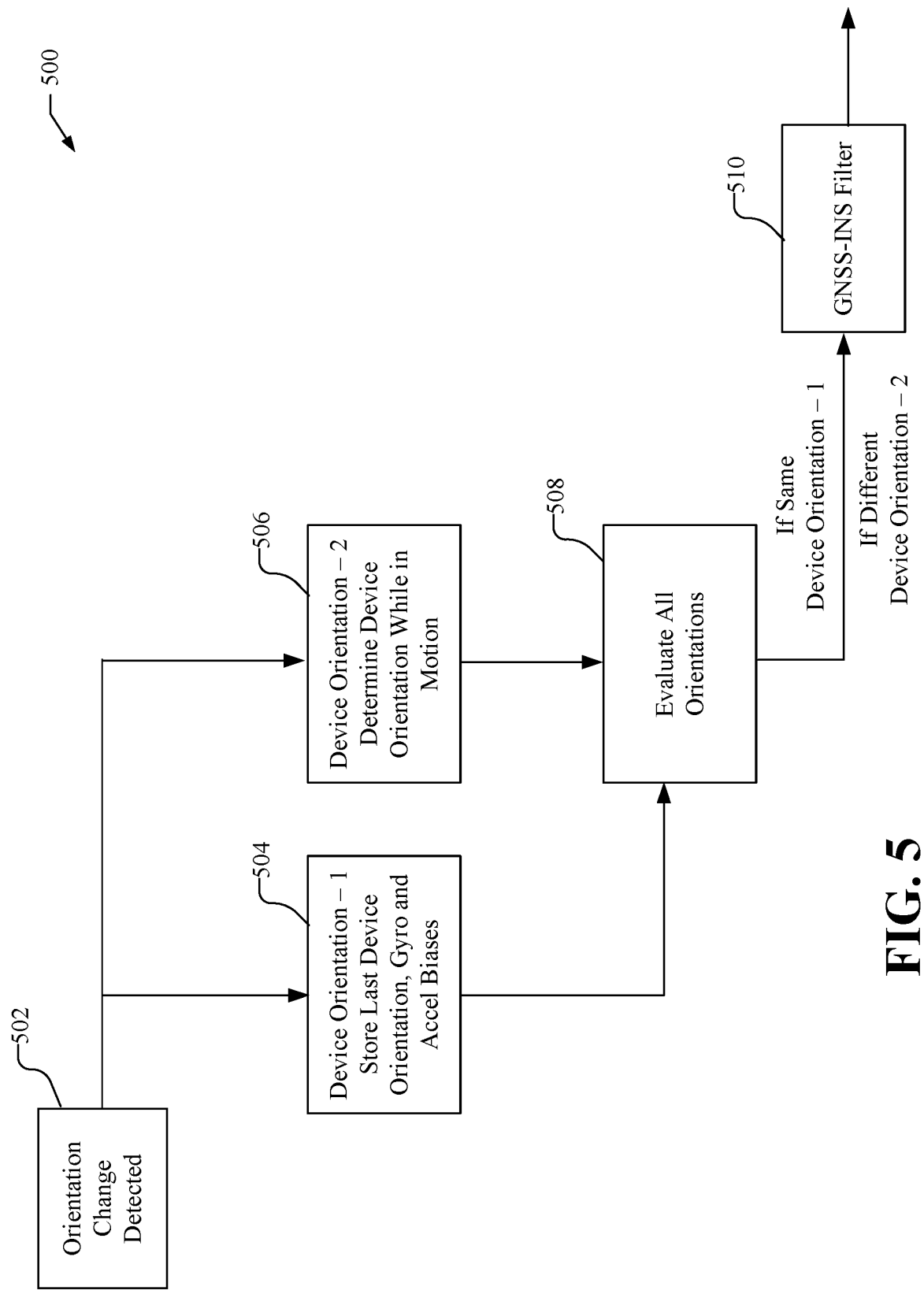
FIG. 5 is a flow diagram illustrating a process of in-motion re-initialization of a GNSS-INS filter in the mobile device after the mobile device has been moved within the vehicle.

FIG. 5 is a flow diagram 500 illustrating a process of in-motion re-initialization of a GNSS-INS filter 322 in the mobile device 100 after the mobile device 100 has been moved within the vehicle 102. In the process illustrated in flow diagram 500, mobile device 100 is assumed to be mounted or otherwise positioned in the vehicle 102 with a fixed orientation, e.g., the mobile device 100 may have been mounted in a cradle or other mounting structure fixed in the vehicle 102. Additionally, the GNSS-INS filter has already been initialized with the orientation of the mobile device 100 with respect to the global reference frame, e.g., either using a conventional static initialization or an in-motion initialization process, such as described in FIG. 4. Additionally, in the process illustrated in flow diagram 500, the gyroscope and accelerometer biases are known.

At block 502, a change in the orientation of the mobile device 100 within the vehicle 102 is detected. For example, while the mobile device 100 may be mounted in a cradle or other mounting structure fixed in the vehicle 102, which normally provides a relative orientation between the mobile device 100 and the vehicle 102 that does not change over time, the orientation of the mobile device 100 within the vehicle 102 may be disturbed inadvertently or intentionally, e.g., by a user, for example, readjusting the mobile device 100 to obtain a better viewing angle. The change of orientation of the mobile device 100 within the vehicle 102 may be detected, e.g., based on measurement data from IMU 310 and the GNSS-IMS filter. For example, the data from one or more of the inertial sensors may be compared to the data (e.g., velocity or heading data) produced by the GNSS-IMS filter, where a significant difference in magnitude of motion as determined by the inertial sensor measurement data and as determined by the GNSS-IMS filter (e.g. greater than a predetermined threshold) may be used as an indication that the mobile device 100 has moved with respect to the vehicle 102. The change in orientation of the mobile device 100 within the vehicle 102 may be detected in other manners, such as using data from the camera 316 (shown in FIG. 3) or from external sensors, such as a switch or sensors in the cradle in which the mobile device 100 is mounted.

At block 504, the last known orientation of the mobile device 100 with respect to the global reference frame is stored as a first orientation. The last known orientation is the orientation of the mobile device 100 prior to the indication of the change in the orientation of the mobile device 100 within the vehicle 102 detected at block 502, and may include parameters, such as the current gyroscope and accelerometer biases. The last known orientation may be based on a previous calibration of the GNSS-INS filter, which have been performed using a conventional static initialization or an in-motion initialization process.

At block 506, a new orientation of the mobile device 100 with respect to the global reference frame is determined while the mobile device 100 is in motion as a second orientation. The second orientation may be determined, for example, after it is determined that the orientation of the mobile device 100 is static with respect to the vehicle 102, e.g., by comparing the measurements produced by the inertial sensors to the measurements produced by the GNSS-IMS filter, e.g., where there is no significant difference in magnitude (e.g. less than a predetermined threshold). In some implementations, the determination of the second orientation may be performed at least in part while the vehicle is turning, e.g., to determine the gravity vector using gyroscope measurements. The orientation of the mobile device 100 with respect to the global reference frame, for example, may be determined using the process illustrated in flow diagram 400 in FIG. 4.

At block 508, all orientations, e.g., the first orientation from block 504 and the second orientation from block 506, are evaluated to determine which orientation to use with the GNSS-INS filter at block 510. The first orientation and the second orientation are evaluated to determine if there has been a significant change in the orientation of the mobile device 100 with respect to the global reference frame. For example, it is possible that the mobile device 100 was moved but replaced in the same orientation with respect to the vehicle 102 (and that the vehicle 102 has not changed its orientation with respect to the global reference frame), and thus, the last known orientation is still valid. On the other hand, it is also possible that orientation of the mobile device 100 with respect to the vehicle 102 is no longer valid. The evaluation of the first orientation and the second orientation, for example, may include comparing the first orientation and the second orientation to determine if there is a significant difference. If a difference between the first orientation and the second orientation, for example, is less than a predetermined threshold, the orientations may be considered same and there is no need to re-initialize the GNSS-INS filter, i.e., the first device orientation (from block 504) is provided to the GNSS-INS filter at block 510. On the other hand, if the difference between the first orientation and the second orientation is greater than the predetermined threshold, the orientations are not the same indicating that the first orientation is no longer valid and the second device orientation (from block 506) is provided to the GNSS-INS filter at block 510.

At block 510, the GNSS-INS filter receives either the first device orientation (from block 504) or the second device orientation (from block 506) and the GNSS-INS filter produces position and heading based on received GNSS data and IMU data. If the first device orientation (from block 504) is used, the GNSS-INS filter continues producing position and heading based on the last known orientation, and thus, is a continuation of previous positioning including position and heading history. On other hand, if the second device orientation (from block 506) is used, the GNSS-INS filter is re-initialized and produces position and heading based on the new orientation.

Figure 6:
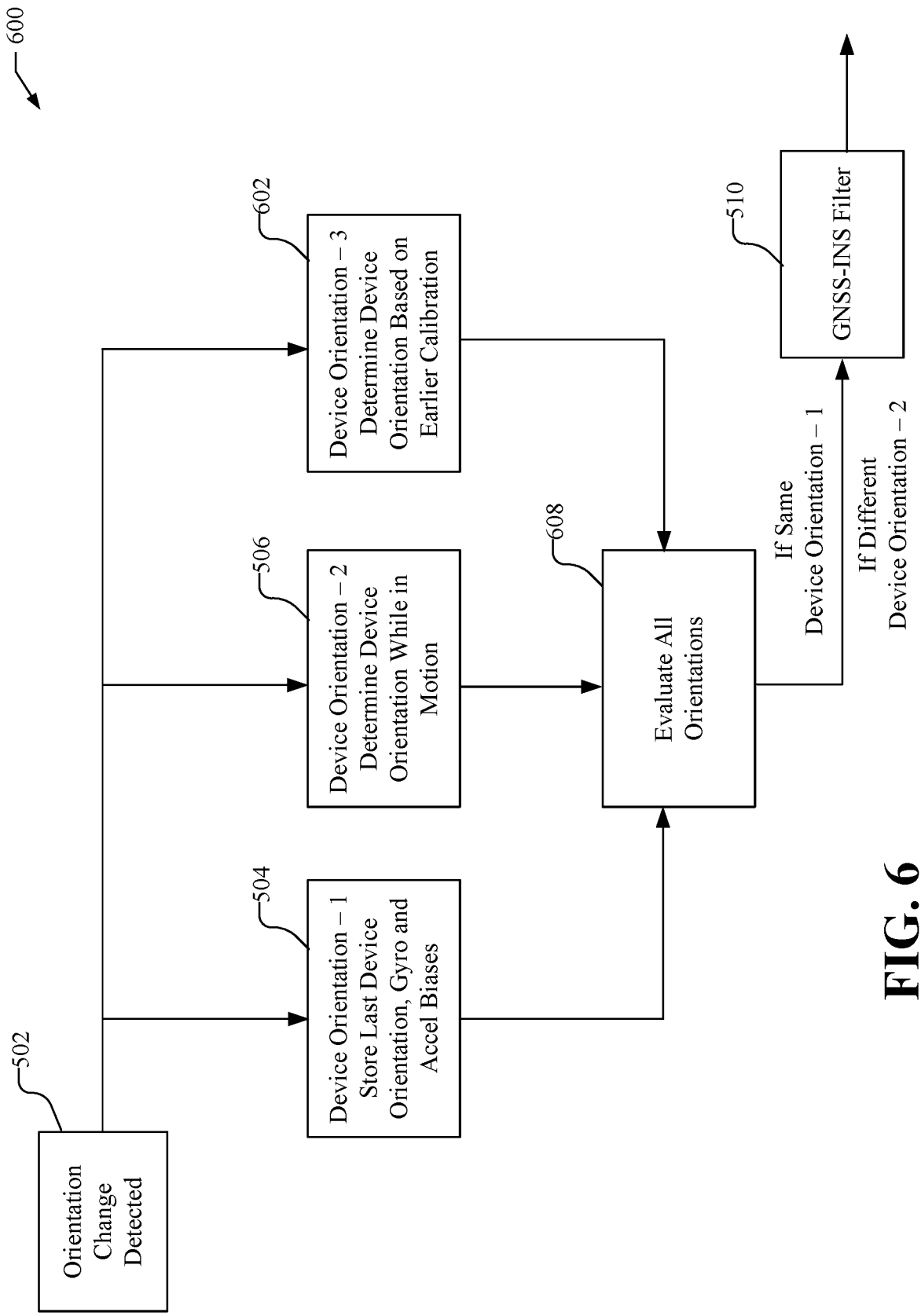
FIG. 6 is a flow diagram illustrating another implementation of a process of in-motion re-initialization of a GNSS-INS filter in the mobile device after the mobile device has been moved within the vehicle.

FIG. 6 is a flow diagram 600 illustrating another implementation of a process of in-motion re-initialization of a GNSS-INS filter 322 in the mobile device 100 after the mobile device 100 has been moved within the vehicle 102. In the process illustrated in flow diagram 600 is similar to the process illustrated in flow diagram 500 in FIG. 5, like designated elements being the same.

As illustrated in FIG. 6, in addition to the first device orientation (from block 504) and the second device orientation (from block 506), after there is an indication of a change in the orientation of the mobile device 100 within the vehicle 102 (from block 502), a third orientation of the mobile device 100 with respect to the global reference frame is determined while the mobile device 100 is in motion. The third orientation, for example, may be based on a previous calibration of the GNSS-INS system, such as from a previous static calibration or from a previous in-motion calibration.

At block 608, similar to block 508 discussed in FIG. 5, all orientations are evaluated, including the first orientation from block 504, the second orientation from block 506, and the third evaluation from block 602. If any of the orientations significantly differs (e.g., as determined by the difference between any two orientations being greater than a predetermined threshold), then the second device orientation (from block 506) is provided to the GNSS-INS filter at block 510. However, if all of the orientations are similar (as determined by the predetermine threshold), then the first device orientation (from block 504) is provided to the GNSS-INS filter at block 510.

Figure 7:
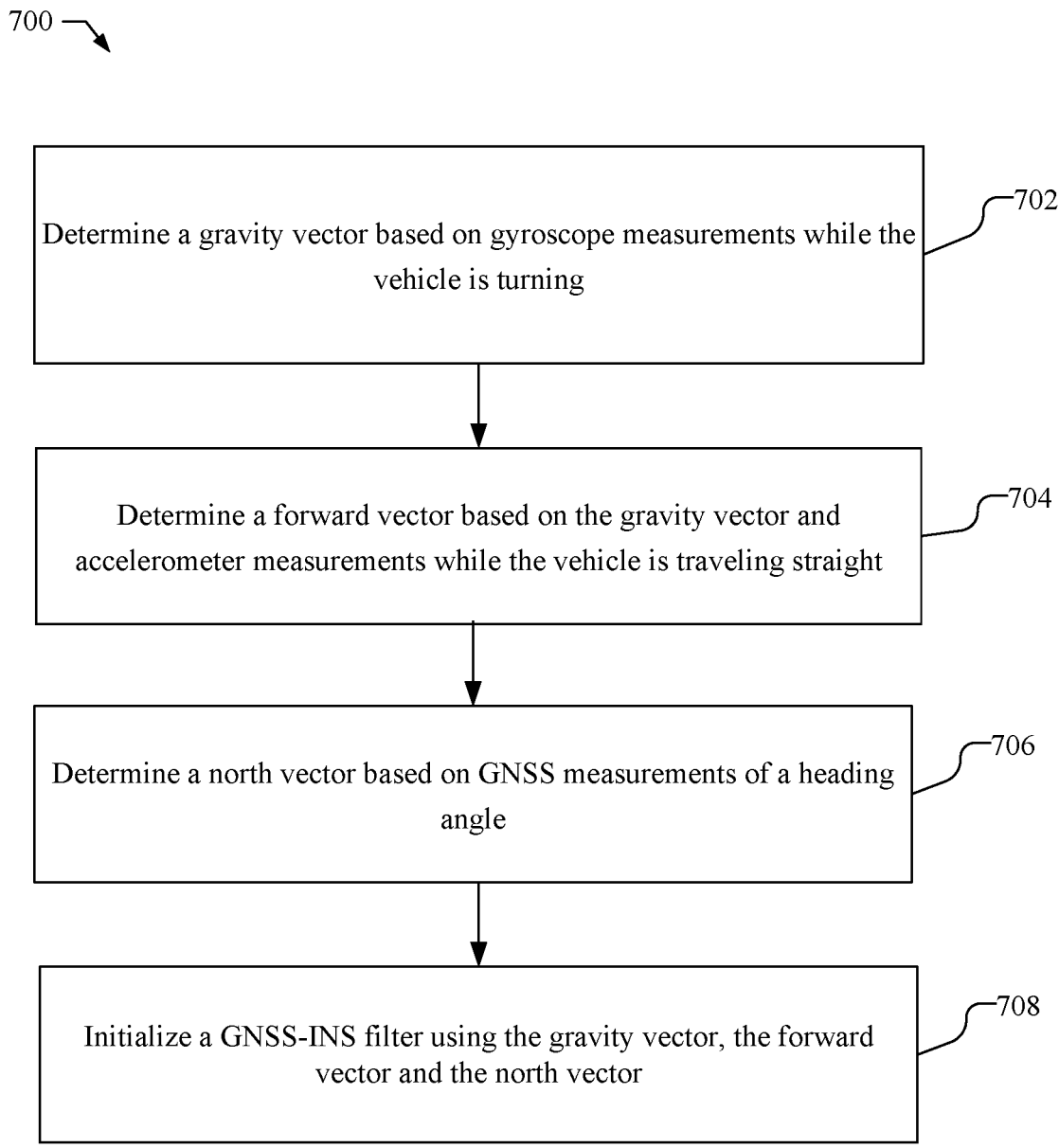
FIG. 7 is a flow chart illustrating a method of in-motion calibration of a GNSS-INS system in a mobile device in a moving vehicle.

FIG. 7 is a flow chart 700 illustrating a method of in-motion calibration of a GNSS-INS system in a mobile device in a moving vehicle, such as mobile device 100 in vehicle 102.

At block 702, the mobile device may determine a gravity vector based on gyroscope measurements while the vehicle is turning, as discussed at block 402 in FIG. 4. The gravity vector may be determined, for example, while the vehicle 102 is turning on a flat surface. Determining the gravity vector may be performed, for example, as discussed at block 402 in FIG. 4. In some implementations, the mobile device may determine that the vehicle is turning using the gyroscope measurements before determining the gravity vector, e.g., by determining when the measured angular rate ($\omega_x$, $\omega_y$,$\omega_z$) is greater than a threshold, for example, as discussed at block 402 in FIG. 4. In some implementations, the gravity vector may be determined based on gyroscope measurements values and a normalized gyroscope value, e.g., as shown in equation 1, as discussed at block 402 in FIG. 4. A means for determining a gravity vector based on gyroscope measurements while the vehicle is turning, for example, may include, e.g., the gyroscopes 312 in the IMU 310, and the one or more processors 302 with dedicated hardware or implementing executable code or software instructions in memory 304 and/or medium 320 shown in FIG. 3.

At block 704, the mobile device may determine a forward vector based on the gravity vector and accelerometer measurements while the vehicle is traveling straight, for example, as discussed at block 404 in FIG. 4. In some implementations, the mobile device may determine the vehicle is traveling straight using the gyroscope measurements before estimating the forward vector, e.g., when the measured angular rate ($\omega_x$,$\omega_y$,$\omega_z$) from the gyroscope is below the threshold, for example, as discussed at block 404 in FIG. 4. In some implementations, the forward vector may be determined based on a difference between accelerometer measurements and the gravity vector and predetermined accelerometer biases, e.g., as shown in equation 5, as discussed at block 404 in FIG. 4. A means for determining a forward vector based on the gravity vector and accelerometer measurements while the vehicle is traveling straight may include, e.g., the accelerometers 311 and the gyroscopes 312 in the IMU 310, and the one or more processors 302 with dedicated hardware or implementing executable code or software instructions in memory 304 and/or medium 320 shown in FIG. 3.

At block 706, the mobile device may determine a north vector based on GNSS measurements of a heading angle, for example, as discussed at block 406 in FIG. 4. A means for determining a north vector based on GNSS measurements of a heading angle may include, e.g., the GNSS receiver 306, and the one or more processors 302 with dedicated hardware or implementing executable code or software instructions in memory 304 and/or medium 320 shown in FIG. 3.

At block 708, the mobile device may initialize a GNSS-INS filter using the gravity vector, the forward vector and the north vector for example, as discussed at block 408 in FIG. 4. For example, initializing the GNSS-INS filter may determine an orientation of the mobile device with respect to a global reference frame, as discussed at block 408 in FIG. 4. A mean for initializing a GNSS-INS filter using the gravity vector, the forward vector and the north vector may include, e.g., the GNSS-INS filter 322, and the one or more processors 302 with dedicated hardware or implementing executable code or software instructions in memory 304 and/or medium 320 shown in FIG. 3.

In some implementations, once the GNSS-INS filter is initialized, the mobile device may further determine a location or position of the mobile device, also called a position fix using the GNSS-INS filter, as discussed at block 408 in FIG. 4. A means for determining a position fix using the GNSS-INS filter may include the IMU 310, the GNSS receiver 306, the GNSS-INS filter 322, and the one or more processors 302 with dedicated hardware or implementing executable code or software instructions in memory 304 and/or medium 320 shown in FIG. 3.

Figure 8:
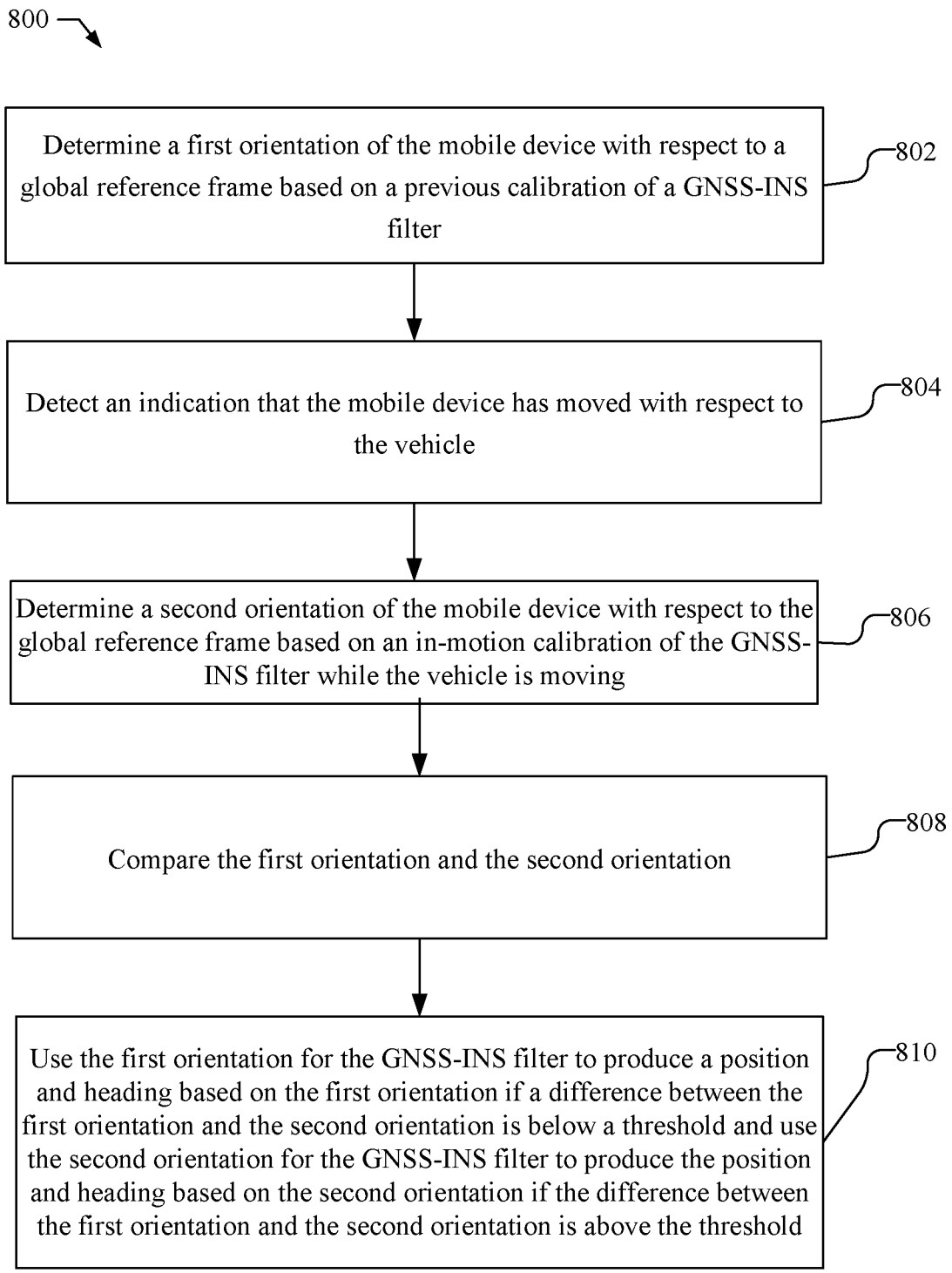
FIG. 8 is a flow chart illustrating another method of in-motion calibration of a GNSS-INS system in a mobile device in a moving vehicle.

FIG. 8 is a flow chart 800 illustrating a method of in-motion calibration of a GNSS-INS system in a mobile device in a moving vehicle, such as mobile device 100 in vehicle 102.

At block 802, the mobile device may determine a first orientation of the mobile device with respect to a global reference frame based on a previous calibration of a GNSS-INS filter, e.g., as discussed at block 504 in FIG. 5. In some implementations, the previous calibration of the GNSS-INS filter may be determined while the vehicle is not moving, e.g., as discussed at block 504 in FIG. 5. In some implementations, the previous calibration of the GNSS-INS filter may be determined while the vehicle is moving, e.g., as discussed at block 504 in FIG. 5. A means for determining a first orientation of the mobile device with respect to a global reference frame based on a previous calibration of a GNSS-INS filter may include the IMU 310, the GNSS receiver 306, the GNSS-INS filter 322, and the one or more processors 302 with dedicated hardware or implementing executable code or software instructions in memory 304 and/or medium 320 shown in FIG. 3.

At block 804, the mobile device may detect an indication that the mobile device has moved with respect to the vehicle, e.g., as discussed at block 502 in FIG. 5. The indication that the mobile device has moved with respect to the vehicle may be detected, e.g., based on comparison of inertial sensor measurement data with at least one of velocity data and heading data from the GNSS-IMS filter and determine the mobile device has moved with respect to the vehicle when a difference between motion determined based on the inertial sensor measurement data and motion determined by the GNSS-IMS filter is greater than a threshold, as discussed at block 502 in FIG. 5. A means for detecting an indication that the mobile device has moved with respect to the vehicle may include the IMU 310, the GNSS receiver 306, the GNSS-INS filter 322, and the one or more processors 302 with dedicated hardware or implementing executable code or software instructions in memory 304 and/or medium 320 shown in FIG. 3.

At block 806, the mobile device may determine a second orientation of the mobile device with respect to the global reference frame based on an in-motion calibration of the GNSS-INS filter while the vehicle is moving, e.g., as discussed at block 506 of FIG. 5. In some implementations, the mobile device may perform the determination of the second orientation of the mobile device with respect to the global reference frame at least in part while the vehicle is turning, e.g., as discussed at block 506 of FIG. 5. A means for determining a second orientation of the mobile device with respect to the global reference frame based on an in-motion calibration of the GNSS-INS filter while the vehicle is moving may include the IMU 310, the GNSS receiver 306, the GNSS-INS filter 322, and the one or more processors 302 with dedicated hardware or implementing executable code or software instructions in memory 304 and/or medium 320 shown in FIG. 3.

At block 808, the mobile device may compare the first orientation and the second orientation, e.g., as discussed at block 508 of FIG. 5. For example, the first orientation may be compared to the second orientation to determine if there is a significant difference, e.g., greater than a predetermined threshold, as discussed at stage 508 of FIG. 5. A means for comparing the first orientation and the second orientation may include the one or more processors 302 with dedicated hardware or implementing executable code or software instructions in memory 304 and/or medium 320 shown in FIG. 3.

At block 810, the mobile device may use the first orientation for the GNSS-INS filter to produce a position and heading based on the first orientation if a difference between the first orientation and the second orientation is below a threshold and use the second orientation for the GNSS-INS filter to produce the position and heading based on the second orientation if the difference between the first orientation and the second orientation is above the threshold, e.g., as discussed at blocks 508 and 510 in FIG. 5. A means for using the first orientation for the GNSS-INS filter to produce a position and heading based on the first orientation if a difference between the first orientation and the second orientation is below a threshold and using the second orientation for the GNSS-INS filter to produce the position and heading based on the second orientation if the difference between the first orientation and the second orientation is above the threshold may include the IMU 310, the GNSS receiver 306, the GNSS-INS filter 322, and the one or more processors 302 with dedicated hardware or implementing executable code or software instructions in memory 304 and/or medium 320 shown in FIG. 3.

In some implementations, the mobile device may additionally determine a third orientation of the mobile device with respect to the global reference frame based on the previous calibration of the GNSS-INS filter, e.g., as discussed at block 602 of FIG. 6. The mobile device may compare the first orientation and the second orientation comprises the first orientation, the second orientation, and the third orientation, wherein the first orientation is used for the GNSS-INS filter if a difference between any of the first orientation, the second orientation, and the third orientation is below the threshold and the second orientation is used for the GNSS-INS filter if the difference between the first orientation, the second orientation, and the third orientation is above the threshold, e.g., as discussed at blocks 608 and 510 of FIG. 6. A means for determining a third orientation of the mobile device with respect to the global reference frame based on the previous calibration of the GNSS-INS filter, wherein comparing the first orientation and the second orientation comprises the first orientation, the second orientation, and the third orientation, wherein the first orientation is used for the GNSS-INS filter if a difference between any of the first orientation, the second orientation, and the third orientation is below the threshold and the second orientation is used for the GNSS-INS filter if the difference between the first orientation, the second orientation, and the third orientation is above the threshold may include the IMU 310, the GNSS receiver 306, the GNSS-INS filter 322, and the one or more processors 302 with dedicated hardware or implementing executable code or software instructions in memory 304 and/or medium 320 shown in FIG. 3.

In some implementations, the mobile device may be configured to determine the second orientation of the mobile device with respect to the global reference frame based on the in-motion calibration of the GNSS-INS filter while the vehicle is moving, e.g., as discussed at block 506 of FIG. 5, by determining a gravity vector based on gyroscope measurements while the vehicle is turning, as discussed at block 402 in FIG. 4. The gravity vector may be determined, for example, while the vehicle 102 is turning on a flat surface. Determining the gravity vector may be performed, for example, as discussed at block 402 in FIG. 4. In some implementations, the mobile device may determine that the vehicle is turning using the gyroscope measurements before determining the gravity vector, e.g., by determining when the measured angular rate $(\omega_x, \omega_y, \omega_z)$ is greater than a threshold, for example, as discussed at block 402 in FIG. 4. In some implementations, the gravity vector may be determined based on gyroscope measurements values and a normalized gyroscope value, e.g., as shown in equation 1, as discussed at block 402 in FIG. 4. A means for determining a gravity vector based on gyroscope measurements while the vehicle is turning, for example, may include, e.g., the gyroscopes 312 in the IMU 310, and the one or more processors 302 with dedicated hardware or implementing executable code or software instructions in memory 304 and/or medium 320 shown in FIG. 3.

The mobile device may be further configured to determine the second orientation of the mobile device with respect to the global reference frame based on the in-motion calibration of the GNSS-INS filter while the vehicle is moving, e.g., as discussed at block 506 of FIG. 5, by determining a forward vector based on the gravity vector and accelerometer measurements while the vehicle is traveling straight for example, as discussed at block 404 in FIG. 4. In some implementations, the mobile device may determine the vehicle is traveling straight using the gyroscope measurements before estimating the forward vector, e.g., when the measured angular rate $(\omega_x, \omega_y, \omega_z)$ from the gyroscope is below the threshold, for example, as discussed at block 404 in FIG. 4. In some implementations, the forward vector may be determined based on a difference between accelerometer measurements and the gravity vector and predetermined accelerometer biases, e.g., as shown in equation 5, as discussed at block 404 in FIG. 4. A means for determining a forward vector based on the gravity vector and accelerometer measurements while the vehicle is traveling straight may include, e.g., the accelerometers 311 and the gyroscopes 312 in the IMU 310, and the one or more processors 302 with dedicated hardware or implementing executable code or software instructions in memory 304 and/or medium 320 shown in FIG. 3.

The mobile device may be further configured to determine the second orientation of the mobile device with respect to the global reference frame based on the in-motion calibration of the GNSS-INS filter while the vehicle is moving, e.g., as discussed at block 506 of FIG. 5, by determining a north vector based on GNSS measurements of a heading angle, for example, as discussed at block 406 in FIG. 4. A means for determining a north vector based on GNSS measurements of a heading angle may include, e.g., the GNSS receiver 306, and the one or more processors 302 with dedicated hardware or implementing executable code or software instructions in memory 304 and/or medium 320 shown in FIG. 3.

The mobile device may be further configured to determine the second orientation of the mobile device with respect to the global reference frame based on the in-motion calibration of the GNSS-INS filter while the vehicle is moving, e.g., as discussed at block 506 of FIG. 5, by determining the second orientation of the mobile device with respect to the global reference frame based on the gravity vector, the forward vector and the north vector, as discussed at block 408 in FIG. 4. A mean for initializing a GNSS-INS filter using the gravity vector, the forward vector and the north vector may include, e.g., the GNSS-INS filter 322, and the one or more processors 302 with dedicated hardware or implementing executable code or software instructions in memory 304 and/or medium 320 shown in FIG. 3.

In some implementations, once the GNSS-INS filter is initialized, the mobile device may further determine a position fix using the GNSS-INS filter using one of the first orientation and the second orientation, as discussed at block 510 in FIG. 5. A means for determining a position fix using the GNSS-INS filter using one of the first orientation and the second orientation may include the IMU 310, the GNSS receiver 306, the GNSS-INS filter 322, and the one or more processors 302 with dedicated hardware or implementing executable code or software instructions in memory 304 and/or medium 320 shown in FIG. 3

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures, or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method of in-motion calibration of a Global Navigation Satellite System (GNSS)—Inertial Navigation System (INS) system in a mobile device in a vehicle, the method comprising:
   determining a gravity vector based on gyroscope measurements while the vehicle is turning;
   determining a forward vector based on the gravity vector and accelerometer measurements while the vehicle is traveling straight;
   determining a north vector based on GNSS measurements of a heading angle; and
   initializing a GNSS-INS filter using the gravity vector, the forward vector and the north vector.

2. The method of claim 1, further comprising:
   determining the vehicle is turning using the gyroscope measurements before determining the gravity vector.

3. The method of claim 1, wherein the gravity vector is determined based on gyroscope measurements values and a normalized gyroscope value.

4. The method of claim 1, further comprising:
   determining the vehicle is traveling straight using the gyroscope measurements before estimating the forward vector.

5. The method of claim 1, wherein the forward vector is determined based on a difference between the accelerometer measurements and the gravity vector and predetermined accelerometer biases.

6. The method of claim 1, wherein initializing the GNSS-INS filter is performed to determine an orientation of the mobile device with respect to a global reference frame.

7. The method of claim 1, further comprising:
   determining a position fix using the GNSS-INS filter.

8. The method of claim 1, further comprising:
   determining a first orientation of the mobile device with respect to a global reference frame based on the initialized GNSS-INS filter; and
   detecting an indication that the mobile device has moved with respect to the vehicle.

9. The method of claim 8, further comprising:
   determining a second orientation of the mobile device with respect to the global reference frame based on an in-motion calibration of the GNSS-INS filter while the vehicle is moving;
   comparing the first orientation and the second orientation; and
   using the first orientation for the GNSS-INS filter to produce a position and a heading based on the first orientation if a difference between the first orientation and the second orientation is below a threshold and using the second orientation for the GNSS-INS filter to produce the position and the heading based on the second orientation if the difference between the first orientation and the second orientation is above the threshold.

10. The method of claim 9, further comprising:
    determining a third orientation of the mobile device with respect to the global reference frame based on the initialized GNSS-INS filter, wherein comparing the first orientation and the second orientation comprises comparing the first orientation, the second orientation, and the third orientation, wherein the first orientation is used for the GNSS-INS filter if a difference between any of the first orientation, the second orientation, and the third orientation is below the threshold and the second orientation is used for the GNSS-INS filter if the difference between the first orientation, the second orientation, and the third orientation is above the threshold.

11. The method of claim 9, wherein determining the second orientation of the mobile device with respect to the global reference frame is performed at least in part while the vehicle is turning.

12. The method of claim 8, wherein detecting the indication that the mobile device has moved with respect to the vehicle comprises comparing inertial sensor measurement data with at least one of velocity data and heading data produced by the GNSS-INS filter and determining the mobile device has moved with respect to the vehicle when a difference between motion determined based on the inertial sensor measurement data and motion determined by the GNSS-INS filter is greater than a threshold.

13. A mobile device in a vehicle, the mobile device configured to support in-motion calibration of a Global Navigation Satellite System (GNSS)-Inertial Navigation System (INS) system in the mobile device, the mobile device comprising:
an inertial measurement unit comprising an accelerometer and a gyroscope;
a GNSS receiver;
at least one memory; and
at least one processor coupled to the inertial measurement unit and the GNSS receiver and the at least one memory, wherein the at least one processor is configured to:
determine a gravity vector based on gyroscope measurements while the vehicle is turning;
determine a forward vector based on the gravity vector and accelerometer measurements while the vehicle is traveling straight;
determine a north vector based on GNSS measurements of a heading angle; and
initialize a GNSS-INS filter using the gravity vector, the forward vector and the north vector.

14. The mobile device of claim 13, wherein the at least one processor is further configured to:
determine the vehicle is turning using the gyroscope measurements before determining the gravity vector.

15. The mobile device of claim 13, wherein the gravity vector is determined based on gyroscope measurements values and a normalized gyroscope value.

16. The mobile device of claim 13, wherein the at least one processor is further configured to:
determine the vehicle is traveling straight using the gyroscope measurements before estimating the forward vector.

17. The mobile device of claim 13, wherein the forward vector is determined based on a difference between the accelerometer measurements and the gravity vector and predetermined accelerometer biases.

18. The mobile device of claim 13, wherein the at least one processor is further configured to:
initialize the GNSS-INS filter to determine an orientation of the mobile device with respect to a global reference frame.

19. The mobile device of claim 13, wherein the at least one processor is further configured to:
determine a position fix using the GNSS-INS filter.

20. The mobile device of claim 13, wherein the at least one processor is further configured to:
determine a first orientation of the mobile device with respect to a global reference frame based on the initialized GNSS-INS filter; and
detect an indication that the mobile device has moved with respect to the vehicle.

21. The mobile device of claim 20, wherein the at least one processor is further configured to:
determine a second orientation of the mobile device with respect to the global reference frame based on an in-motion calibration of the GNSS-INS filter while the vehicle is moving;
compare the first orientation and the second orientation; and
use the first orientation for the GNSS-INS filter to produce a position and a heading based on the first orientation if a difference between the first orientation and the second orientation is below a threshold and using the second orientation for the GNSS-INS filter to produce the position and the heading based on the second orientation if the difference between the first orientation and the second orientation is above the threshold.

22. The mobile device of claim 21, wherein the at least one processor is further configured to:
determine a third orientation of the mobile device with respect to the global reference frame based on the initialized GNSS-INS filter, wherein to compare the first orientation and the second orientation, the at least one processor is configured to compare the first orientation, the second orientation, and the third orientation, wherein the first orientation is used for the GNSS-INS filter if a difference between any of the first orientation, the second orientation, and the third orientation is below the threshold and the second orientation is used for the GNSS-INS filter if the difference between the first orientation, the second orientation, and the third orientation is above the threshold.

23. The mobile device of claim 21, wherein to determine the second orientation of the mobile device with respect to the global reference frame, the at least one processor is configured to:
determine the second orientation of the mobile device with respect to the global reference frame while the vehicle is turning.

24. The mobile device of claim 20, wherein to detect the indication that the mobile device has moved with respect to the vehicle, the at least one processor is configured to:
compare inertial sensor measurement data with at least one of velocity data and heading data produced by the GNSS-INS filter; and
determine the mobile device has moved with respect to the vehicle when a difference between motion determined based on the inertial sensor measurement data and motion determined by the GNSS-INS filter is greater than a threshold.

25. A mobile device in a vehicle, the mobile device configured to support in-motion calibration of a Global Navigation Satellite System (GNSS)-Inertial Navigation System (INS) system in the mobile device, the mobile device comprising:
means for determining a gravity vector based on gyroscope measurements while the vehicle is turning;
means for determining a forward vector based on the gravity vector and accelerometer measurements while the vehicle is traveling straight;
means for determining a north vector based on GNSS measurements of a heading angle; and
means for initializing a GNSS-INS filter using the gravity vector, the forward vector and the north vector.

26. The mobile device of claim 25, further comprising:
means for determining the vehicle is turning using the gyroscope measurements before determining the gravity vector.

27. The mobile device of claim 25, further comprising:
means for determining the vehicle is traveling straight using the gyroscope measurements before estimating the forward vector.

28. The mobile device of claim 25, further comprising:
means for initializing the GNSS-INS filter to determine an orientation of the mobile device with respect to a global reference frame.

29. The mobile device of claim 25, further comprising:
means for determining a first orientation of the mobile device with respect to a global reference frame based on the initialized GNSS-INS filter;
means for detecting an indication that the mobile device has moved with respect to the vehicle;
means for determining a second orientation of the mobile device with respect to the global reference frame based on an in-motion calibration of the GNSS-INS filter while the vehicle is moving;
means for comparing the first orientation and the second orientation; and
means for using the first orientation for the GNSS-INS filter to produce a position and a heading based on the first orientation if a difference between the first orientation and the second orientation is below a threshold and using the second orientation for the GNSS-INS filter to produce the position and the heading based on the second orientation if the difference between the first orientation and the second orientation is above the threshold.

30. A non-transitory computer-readable medium storing computer executable code at a mobile device, the code when executed by at least one processor causes the at least one processor to:
determine a gravity vector based on gyroscope measurements while a vehicle is turning;
determine a forward vector based on the gravity vector and accelerometer measurements while the vehicle is traveling straight;
determine a north vector based on GNSS measurements of a heading angle; and
initialize a GNSS-INS filter using the gravity vector, the forward vector and the north vector.

* * * * *